US006480591B1

(12) United States Patent
Penfield et al.

(10) Patent No.: US 6,480,591 B1
(45) Date of Patent: *Nov. 12, 2002

(54) REAL-TIME CALL RATING AND DEBITING SYSTEM AND METHOD FOR MULTIPLE CALLS

(75) Inventors: Robert F. Penfield, Concord; Patrick J. McLampy, Pepperell, both of MA (US)

(73) Assignee: Priority Call Management, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,316

(22) Filed: Mar. 1, 2000

Related U.S. Application Data

(63) Continuation-in-part of application No. 09/025,877, filed on Feb. 19, 1998, now Pat. No. 6,058,173.

(51) Int. Cl.[7] .................... H04M 17/00; H04M 15/00
(52) U.S. Cl. .................. 379/144.01; 379/112.01; 379/114.01; 379/114.03; 379/114.05; 379/114.2; 455/406
(58) Field of Search .................. 379/111, 112.01, 379/114.01, 114.03, 114.05, 114.15, 114.17, 114.2, 114.28, 144.01, 144.06; 455/406, 407, 408

(56) References Cited

U.S. PATENT DOCUMENTS

| | | | | |
|---|---|---|---|---|
| 5,469,497 A | * | 11/1995 | Pierce et al. | 379/115.01 |
| 5,765,105 A | * | 6/1998 | Kuriki | 455/410 |
| 5,815,561 A | * | 9/1998 | Nguyen et al. | 37/115.01 |
| 5,825,863 A | * | 10/1998 | Walker | 379/144 |
| 5,903,629 A | * | 5/1999 | Campbell, IV et al. | 379/88.24 |
| 5,953,398 A | * | 9/1999 | Hill | 379/112 |
| 5,960,069 A | * | 9/1999 | Felger | 379/114 |
| 5,995,822 A | * | 11/1999 | Smith et al. | 455/406 |
| 6,009,156 A | * | 12/1999 | Cross | 379/144.01 |
| 6,032,038 A | * | 2/2000 | Schroderus et al. | 455/405 |
| 6,058,173 A | * | 5/2000 | Penfield et al. | 379/144 |
| 6,226,364 B1 | * | 5/2001 | O'Neil | 379/112 |

* cited by examiner

Primary Examiner—Curtis Kuntz
Assistant Examiner—Quoc D. Tran
(74) Attorney, Agent, or Firm—Dority & Manning, P.A.; Leonard W. Pojunas, Jr., Esquire

(57) ABSTRACT

In general, a call rating and debiting system provides a way of rating and debiting complex debit card calls. The system estimates the time when a subscriber's balance will expire by using total charges for all calls for a given time period. Estimation is performed by accounting for time already paid for, reserving a minimum continuation time for adding a new call, reserving time for all calls up to a latest paid for time, estimating remaining time before a subscriber's balance reaches zero, based upon a remaining balance achieved after the system accounts for time already paid for, reserving a minimum continuation time for adding a new call and reserving time for all calls up to the latest paid for time, and setting a time limit for all calls in accordance with any portion of the aforementioned. An alternative embodiment of the system allows a subscriber's account balance to be automatically increased after the balance decreases past a predefined minimum.

42 Claims, 7 Drawing Sheets

REAL-TIME CALL RATING AND DEBITING SYSTEM AND METHOD FOR MULTIPLE CALLS

CLAIM OF PRIORITY AND CROSS REFERENCE TO RELATED APPLICATIONS

This application is a continuation-in-in-part of copending application entitled, "Real Time Call Rating and Debiting System," having application Ser. No. 09/025,877, and filed on Feb. 19, 1998, now U.S. Pat. No. 6,058,173 which is also incorporated herein by reference. Further, the invention disclosed in this application is related to and compatible with the telephone call completion hardware system disclosed and claimed in copending, and commonly owned, U.S. application Ser. No. 08/960,860, which is incorporated herein by reference.

FIELD OF THE INVENTION

The present invention relates generally to the field of credit/debit card monitoring, and more particularly, to a system and method for performing real-time call rating and debiting for a given subscriber to insure that charges incurred upon a credit/debit card do not exceed an available balance.

BACKGROUND OF THE INVENTION

In conventional credit/debit card and calling card applications, there are typically only two calls involved. Specifically, these calls are an inbound call, derived from a caller/subscriber into a service provider's platform, and an outbound call from the service provider's platform to a destination number. Computation of time remaining on a credit/debit card, based upon an available balance in a subscriber's account, typically is straightforward for the two-call scenario, even if both legs of the call are being charged. However, unlike in conventional calling systems supported by credit/debit card and calling card applications, modem calling systems are much more complex. By way of example, in modem calling systems there can be applications involving one telephone number with multiple simultaneous inbound calls, multiple "follow-me" calls, or conferencing calls. Moreover, more than two calls may be in progress at the same time. Unfortunately, due to the complexity of modem calling systems, conventional credit/debit card and calling card applications are not capable of performing functions such as coordination of multiple calls or conferences, or insuring that charges incurred do not exceed an available balance in a subscriber's account.

SUMMARY OF THE INVENTION

In light of the foregoing, the invention generally relates to a system for rating and debiting complex debit card calls. The preferred embodiment of the invention estimates the time when a subscriber's balance will expire by using the total charges for all calls for a given time period. Estimation is performed by a software process which is capable of accounting for time already paid for, reserving a minimum continuation time for adding a new call, reserving time for all calls up to a latest paid for time, estimating remaining time before a subscriber's balance reaches zero, based upon a remaining balance achieved after the software process accounts for time already paid for, reserving a minimum continuation time for adding a new call and reserving time for all calls up to the latest paid for time, and setting a time limit for all calls in accordance with any portion of the aforementioned. In accordance with an alternative embodiment of the invention, a subscriber's account balance may be automatically increased after the balance decreases past a predefined minimum account balance.

The invention has numerous advantages, a few of which are delineated hereafter as examples. Note that the embodiments of the invention, which are described herein, possess one or more, but not necessarily all, of the advantages set out hereafter.

One advantage of the invention is that it provides a real-time call rating and debiting process for all calls made by a subscriber to insure that the charges incurred do not exceed an available balance in the subscriber's account.

Another advantage is that it provides a method for rating and billing complex debit card telephone calls, such as one number with simultaneous inbound calls, multiple "follow me" calls or conference calls.

Another advantage is that it allows a subscriber to continue multiple calls, even after the subscriber's account balance has decreased below a predetermined balance, by increasing the subscriber's account balance when the subscriber's account balance reaches the predefined balance amount.

Other features and advantages of the present invention will become apparent to one of reasonable skill in the art upon examination of the following drawings and detailed description. It is intended that all such additional features and advantages be included herein within the scope of the present invention, as described by the claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiments, but are for explanation and for better understanding. Further, the drawings are not necessarily to scale, emphasis instead being placed upon clearly illustrating the principles of the invention. Finally, like referenced numerals in the figures designate corresponding parts throughout the several drawings.

DESCRIPTION OF THE PREFERRED EMBODIMENTS

The call rating system of the present invention can be implemented in hardware, software, firmware, or a combination thereof. In the preferred embodiment, the call rating system is implemented in software or firmware that is stored in a memory that is executed by a suitable instruction execution system. If implemented in hardware, as in an alternative embodiment, the system can be implemented with any or a combination of the following technologies, which are all well-known in the art: a discrete logic circuit having logic gates for implementing logic functions upon data signals, an application specific integrated circuit having logic gates for implementing logic functions upon data signals, an application specific integrated circuit having appropriate logic gates, a programmable gate array (PGA), a field programmable gate array (FPGA), exe.

Figure 1:
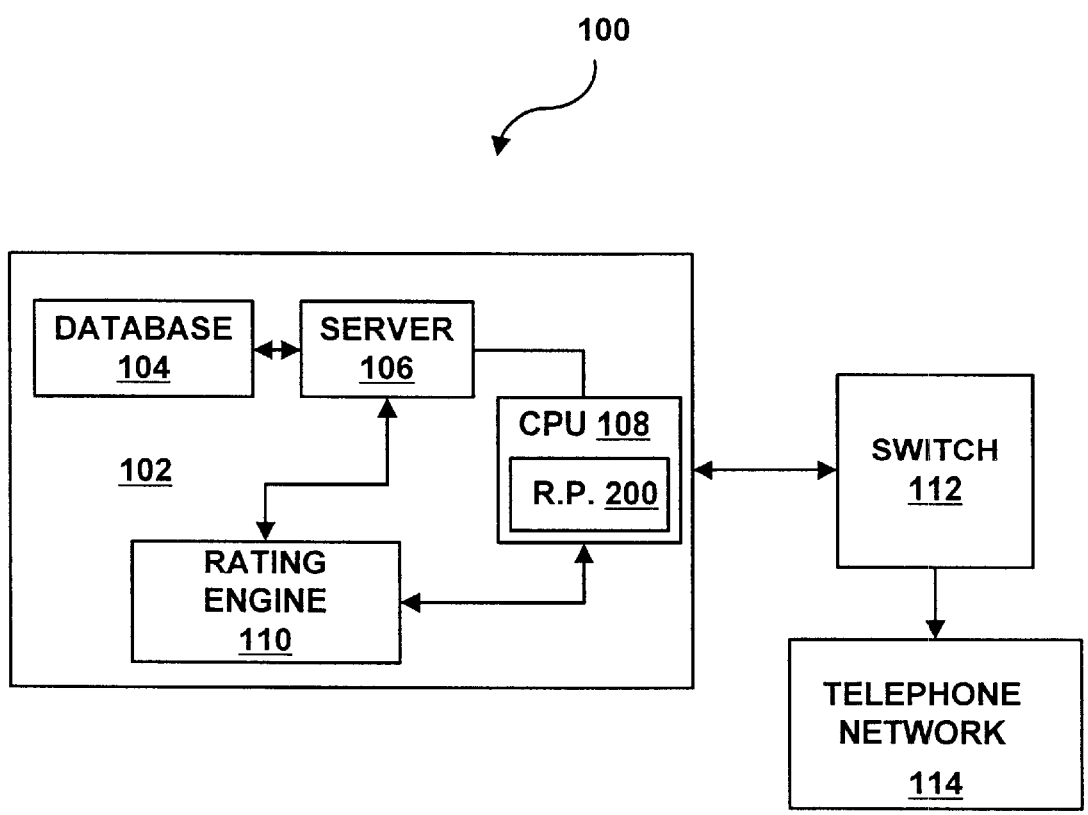
FIG. 1 is a block diagram illustrating the call rating system of the present invention.

Referring now to the drawings wherein like referenced numerals designate corresponding parts throughout the drawings, FIG. 1 is a block diagram illustrating the call rating system 100 of the present invention, wherein a call is made from a subscriber, to a destination. As shown by FIG. 1, a computer system 102 is connected to a switch 112, which is, in turn, connected to a telephone network 114. A database 104, database server 106, CPU 108 and rating engine 110 are located within the computer system 102 and function as described in detail hereinbelow.

In accordance with the preferred embodiment of the invention, a rating program 200, which may be located in the CPU 108, provides functionality to be performed by the call rating system 100. The rating program 200, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The present call rating system 100 uses the concept of a call object for representing each call within the call rating system 100. A call object is a data structure that contains all data pertinent to a given call, including the subscriber from which a call derived, the call rate used for the call, and the rating option(s) that apply to the call. The CPU 108 contains various client processes each of which perform specific services or functions for a call such as, but not limited to, control of the switch 112 and responsibility for receiving calls, routing calls, placing calls, connecting calls to each other and to conferences and attaching tones to calls (ring, busy, error tone). As part of the call routing function, a new call object is created for a new outbound call to be placed by the call rating system 100.

Another client process performed is the control of internal voice ports and the performance of services that require interacting with a caller. This includes playing prompts, receiving touch-tone input, and recording and playback of voice recordings or fax messages. When a call object is sent to the CPU 108, the object is tagged with the service to be executed on the call. The rating engine 110 then sends the call to the process that registers for that service which the call is tagged. The database server 106 for the system 100 maintains the database 104 on the system's hard disk and performs create, read, write, and update functions that the client processes request.

In accordance with the preferred embodiment of the invention, call rates are defined by using an origin and a destination, an initial period, an initial rate, and a subsequent billing period and rate. Herein, an origin is defined as a calling party's telephone number, or, in other words, where a call originates. A destination is defined as a called party's telephone number, or, in other words, where a call terminates. Regarding the initial period and initial rate, an initial period with an initial rate, or charge, is used to effect a minimum charge for a call. For example, with a rate of 0.10 cents per six seconds, and initial period of 30 seconds with an initial rate of 0.50 cents, a call with less than 25 seconds of call time will be charged 0.50 cents. Finally, the billing period may be defined as the unit of time that a call rate applies to. Calls are charged for the number of billing periods that the call lasts. It should be noted that, in accordance with the preferred embodiment of the invention, inbound and outbound rates are defined in separate call rating tables that are located in the database 104.

Additional options for call rating may include rate by time of day, rate by day of week, and rate by holiday. Further, calls may be charged from fee call arrival for inbound calls, dialing complete for outbound calls, or from when a call is answered for either inbound or outbound calls. It should be noted that more complex rating methods, such as variable rating, could be employed, however, a preferred implementation of the call rating system 100 uses an initial period and initial rate and a subsequent billing period and subsequent billing rate.

Figure 2:
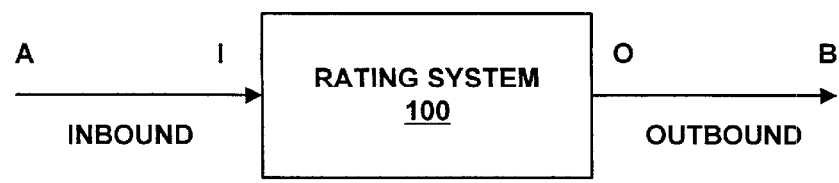
FIG. 2 is a block diagram illustrating an application of the call rating system in an inbound and outbound scenario.

FIG. 2 is a simplified diagram of an application of the present invention to a simple inbound and outbound call scenario. For inbound calls, labeled "Inbound", the origin, designated as A in FIG. 2, is the calling party location/number supplied by the telephone network. The destination for an inbound call, designated as I in FIG. 2, may be either, the called party location/number supplied by the telephone network, which corresponds to a trunk or port to which the inbound call arrived, or the telephone location/number defined in the call rating system 100 for the inbound call. The later of the two destinations may be configured by the rating table of FIG. 1, wherein the telephone location/number associated with the inbound call is predefined. As such, for purposes of call rating, an inbound call rate is the rate for A to I.

With regard to outbound calls, the origin of the outbound call varies depending on the type of call. The destination of a call is the location/number called by the call rating system 100 that is designated as B in FIG. 2. As such, for purposes of call rating, an outbound call rate is the rate for O to B.

As an example, for "tandem" calls, which are routed through the call rating system 100 using the inbound calling and called party, the origin of the inbound call is the origin of the original inbound call, also designated as A in FIG. 2. Alternatively, if an outbound call is generated from another call (e.g., follow me out-dial for an inbound call), the origin of the call is the location/number defined in the system 100 for the inbound call, which, as previously mentioned, is designated as I in FIG. 2. It should be noted that when there is no inbound call associated with an outbound call, the location/number defined in the call rating system 100 for the outbound call is used as the origin, which is designated as O in FIG. 2.

Figure 3:
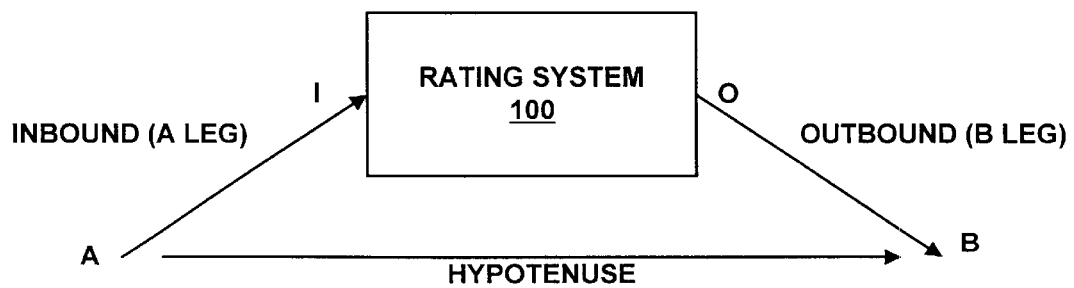
FIG. 3 is a block diagram illustrating an application of the call rating system wherein the call rating system has hypotenuse rating.

FIG. 3 illustrates a call made via the call rating system 100 of FIG. 1 that has hypotenuse rating. As known by one of reasonable skill in the art, hypotenuse rating is usually used to give preferential rates to certain routes. An inbound call, which has originated from an origin, A, is routed to a destination, B. A hypotenuse rate is used to cover both inbound and outbound legs with a single rate, where the inbound call (leg A) is not charged for the time that leg A and leg B are connected.

As an example, the rate for A to I could be 10 cents per minute and the rate for I to B could be 20 cents per minute. A hypotenuse rate for particular A to B routes may be 25 cents, thereby saving the subscriber 5 cents per minute. It will be appreciated by one of ordinary skill in the art that two outbound legs may alternatively be compensated for by the hypotenuse rating option of FIG. 3.

Figure 4:
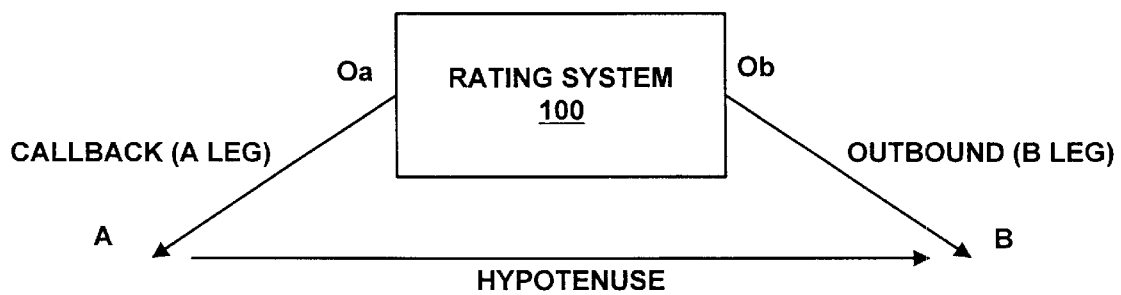
FIG. 4 is a block diagram illustrating an application of the call rating system wherein the call rating system has hypotenuse rating for a callback scenario.

FIG. 4 illustrates hypotenuse rating for a callback scenario wherein the call rating system 100 is the origin of both a callback call and an outbound call. As known in the art, the callback scenario may be used when the cost of a call placed by a subscriber from the subscriber's phone to the call rating system 100 would cost more than the cost of a call from the call rating system 100 to the subscriber. In accordance with the preferred embodiment, a callback call is initiated by sending a message over the telephone network 114 to the call rating system 100, or by dialing a designated location/number which terminates at the call rating system 100, and hanging up before the system answers. In the latter case, the location/number to call back is stored in the system database 104. In the former case, the location/number to call back could be in the data message or, alternatively, stored in the database 104.

As illustrated by FIG. 4, the A leg is a callback from an origin, designated as Oa, specified in the call rating system 100, to the subscriber's location/number "A". The subscriber then enters the location/number of the desired destination to call. The B leg is an outbound call from an origin, designated as Ob, specified in the call rating system 100 to the desired destination location/number "B". With normal call rating, the A leg is charged the rate for Oa to A and the B leg is charged the rate for Ob to B. However, when hypotenuse rating is in effect (when the legs, or calls, are connected together), the B leg is charged the hypotenuse rate for A to B, and the A leg is not charged while it is connected to the B leg.

In accordance with the preferred embodiment of the invention, the call rating system 100 is capable of providing for the rating of multiple calls at a single time. For situations where one subscriber has more than two calls in progress at the same time, the time limit for the calls is calculated based upon when the present subscriber's available balance is depleted. It should be noted that since calls are charged by whole billing periods, each call's time limit must be at the end of a billing period. As such, the time limit of one call for the present subscriber will not necessarily be the same as the time limit for another call for the present subscriber.

For purposes of providing an example, multiple call scenarios may include, but are not limited to, a single number application or a conferencing application, both of which are further described as examples hereinbelow. In a single number application, a caller who dials a subscriber's number may listen to the subscriber's greeting and select to hold while the subscriber is contacted. Assuming that the subscriber has three "follow-me" numbers set up (home, office, and cellular phone), and a pager, the call rating system 100 may place outbound calls to the three follow-me numbers and the pager. If all of the outbound calls are answered, the subscriber will have five active calls on the call rating system 100 simultaneously (1 inbound and 4 outbound).

Referring now to a conferencing application, a subscriber dials the call rating system 100, logs into their account, and places a call to a desired destination number. After talking with the called party, the subscriber may wish to conference another party. The called party is then placed on hold and the subscriber places a call to a second destination. The subscriber then creates a conference on the call rating system 100 between the subscriber and the two parties.

Time limits for all calls are set based upon an estimation of the time when the present subscriber's balance is depleted. This estimation is performed, based upon the total charges of all calls per second, as is further described in detail hereinbelow. This process is performed in accordance with the preferred embodiment of the invention, by first accounting for any time already paid for by the present subscriber, as defined by the limit in the present subscriber's account. A minimum continuation time may then be reserved by the call rating system 100 to provide for the case in which a new call is added to presently pending calls. Time may also be reserved for all calls up to the present subscriber's latest paid/reserved time.

In order to estimate the time at which the present subscriber's balance will run out, the remaining balance after any of the above-mentioned reservations, or accounting, has been performed, is divided by the total charges per second. The time limit for each call will be the end of the latest billing period, equal to or earlier than, the estimated time limit. As such, the call rating system 100 assures that calls will be terminated before the present subscriber's balance is exceeded.

The flow charts of FIGS. 5–8 describe the preferred method of processing for call rating and debiting performed by the call rating system 100 of the present invention. As a preliminary matter, a compute_call procedure, described in FIGS. 5–8, is performed at the following various points during a call in order to compute charges for the call and establish a call time limit based upon funds available in the present subscriber's account and upon other calls presently in progress for the present subscriber. The various points include, inbound call arrival, outbound call requests, outbound call placement, inbound/outbound call answered, connection of one call to another call, connection of call to conference, connection of call to internal resources (e.g., voice, fax, speech recognition, etc.), and invocation of a service (e.g., place call, leave message, etc.).

Figure 5:
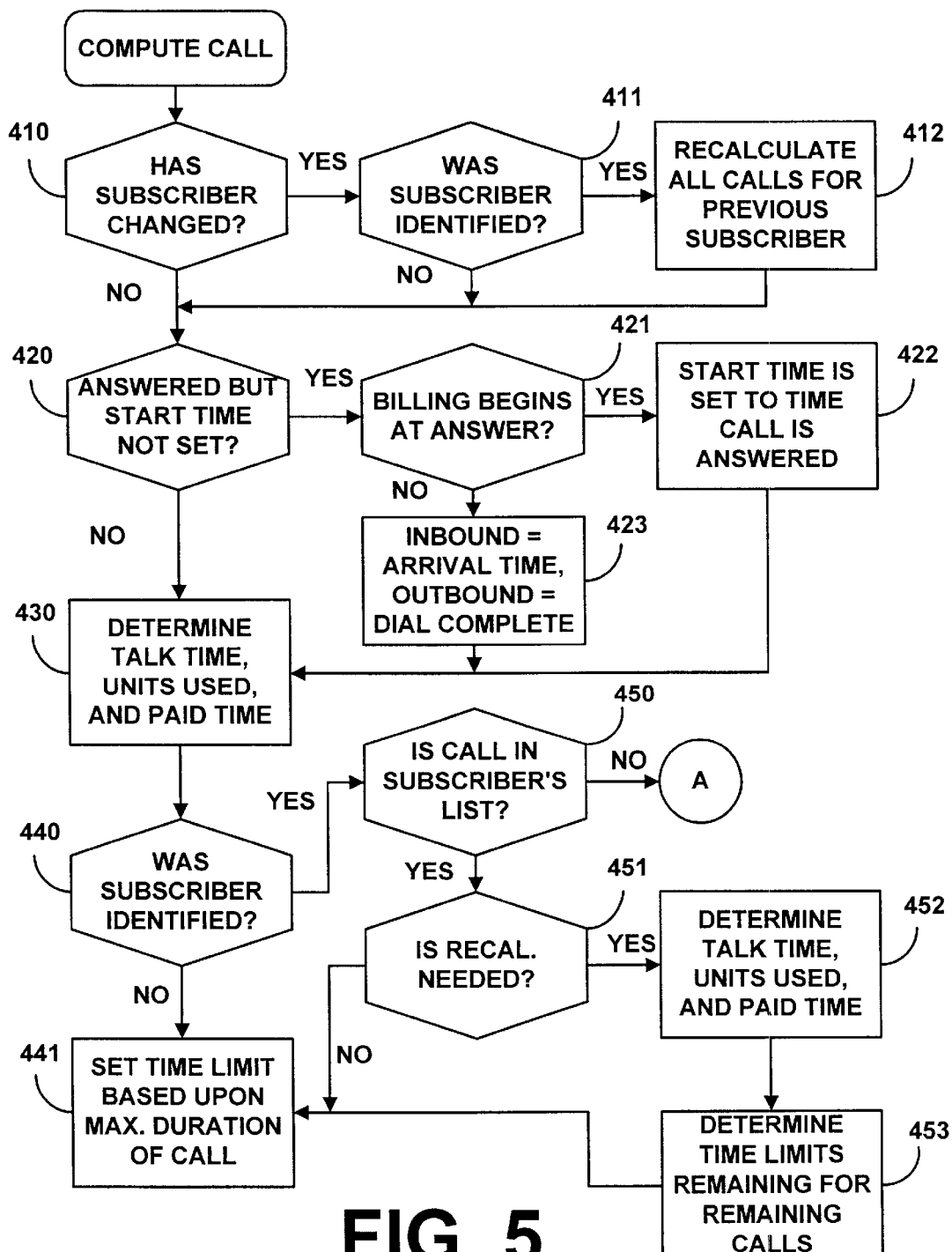
FIG. 5 is a flowchart logically illustrating a compute_call procedure performed by the call rating system of FIG. 1.

Referring now to FIG. 5, as shown by block 410, the call rating system 100 first tests whether a call, either inbound or outbound, is being billed to the same subscriber as it was billed to when the call began. As shown by block 411, if the subscriber for the call has changed from the last execution of the compute_call procedure, or this is the first execution of the compute_call procedure, the call rating system 100 tests whether the subscriber was defined the last time the compute_call procedure was executed. In accordance with the preferred embodiment of the invention, a subscriber may be defined by determining the telephone number dialed by the caller or by determining a telephone number or account number entered by the caller in response to a prompt by the call rating system 100.

As shown by block 412, if the subscriber was defined the last time the compute_call procedure was executed, and the subscriber has changed since the last time the compute_call procedure was executed, the call is removed from the previous subscriber's list, which is located in the database 104, and all calls for the previous subscriber are recalculated.

In accordance with the preferred embodiment of the invention, each call for the previous subscriber is recalculated in the following manner. Except when a call is the A leg of a connection with hypotenuse rating, or a charging B leg, the difference between the current time of the call and the last computation time of the call is added to the talk time for the call. As stated hereinabove, a charging B leg is a billing option wherein the rate for a B leg is the sum of the call rate for the A and B legs and the A leg is not charged while both calls are connected.

The talk time for the call is defined as the total time charged to the call. It should be noted that the talk time for a call typically differs from the lapsed time of a call. The lapsed time of a call may be defined as the period in which time is charged. Unlike lapsed time, talk time may be defined as the time starting from when the call is answered, as opposed to call arrival or completion of dialing, and when rating options cause charging of the call to be suspended during the call. Rating options that may cause charging of the call to be suspended during the call include "hypotenuse," "charging B leg" and "rate connections only." The "rate connections only" rating option does not charge an inbound call for the time the call is connected to an internal resource such as a voice processing port, instead the inbound call is only charged for the time when it is connected to another call. Units used to determine the talk time for a call are calculated using the total talk time, while the paid time for the call is the end of the current billing period.

Recalculation of each call is then concluded by the call rating system 100 executing a calc_limits procedure in order to determine time limits for the previous subscriber's remaining calls. The calc_limits procedure is further described in detail with reference to FIG. 7.

After either, all calls for the previous subscriber have been recalculated, as shown by block 412, the call rating system 100 has determined that the subscriber was not defined the last time the compute_call procedure was executed, as shown by block 411, or the call rating system 100 has determined that the subscriber has not changed, as shown by block 410, the call rating system 100 determines whether the call has been answered by the called party at the destination, but the start time for the call has not been set, as shown by block 420. As shown by block 421, if the call has been answered and the start time has not been set, a check is made by the call rating system 100 to determine whether billing for the call should begin when the call is answered. As shown by block 422, if the call rating system 100 is configured to begin billing when the call is answered, the start time for the call is set to the time that the call was answered. Otherwise, as shown by block 423, the start time for the call is set to the arrival time for inbound calls, and the dialing completed time for outbound calls.

Alternatively, if the call has been answered and the start time has been set, as shown by block 430, the talk time, units used, and paid time are determined. To determine the talk time, except when the call is the A leg of a connection with hypotenuse rating or a charging B leg, the difference between the current time and last computation of the call is added to the talk time for the call to derive the actual talk time. The units used is calculated from the total talk time as follows. If the total talk time is less that the initial period, the units used is equal to the initial rate. Otherwise, the units used is equal to the initial rate+(subsequent rate * ((talk time−initial period)/subsequent period)). Finally, the paid time for the call is determined by setting the paid time to the end of the current billing period. It should be noted that since a whole billing period is charged for any portion of a billing period, the paid time and the current talk time are not the same.

As shown by block 440, a check is then performed to determine if the subscriber, to whom the call is being billed, has been identified. As previously mentioned hereinabove, a subscriber may be defined by deter_mining the telephone number dialed by the caller or by determining a telephone number or account number entered by the caller in response to a prompt by the call rating system 100. If the subscriber that the call is being billed to has been identified, additional processing for the call and the subscriber's other calls may be required, as described in further detail hereinbelow. However, as shown by block 441, if the subscriber has not been identified, and as a result, the call is not being charged to a subscriber, the time limit for the call is set based upon a maximum duration of a call. The maximum duration of a call is a preconfigured maximum call length allowed by the call rating system. Preferably, the maximum call length is set to twenty-four hours.

As shown by block 450, if the subscriber that the call is being billed to is identified, a check is then performed to determine if the call is in the subscriber's list. If the call is not already in the subscriber's list of calls, the call rating system 100 needs to determine if there are enough finds in the subscriber's account to add this particular call, as further described in detail hereinbelow, with reference to FIG. 6.

However, as shown by block 451, if the call is in the subscriber's list, all calls for the subscriber must be recalculated if a) a call is answered, b) the subscriber for the call changes, or c) the charging status of the call changes (transition to or from Leg A of hypotenuse or charge B Leg).

As shown by block 452, if one of the above-mentioned three conditions is met, each call for the subscriber is recalculated as previously described with reference to block 430. As shown by block 453, the call rating system 100 will then determine the time limits remaining for the subscriber's remaining calls, otherwise referred to herein as executing the calc_limits procedure. The calc_limits procedure is described in detail with reference to FIG. 7.

Figure 6:
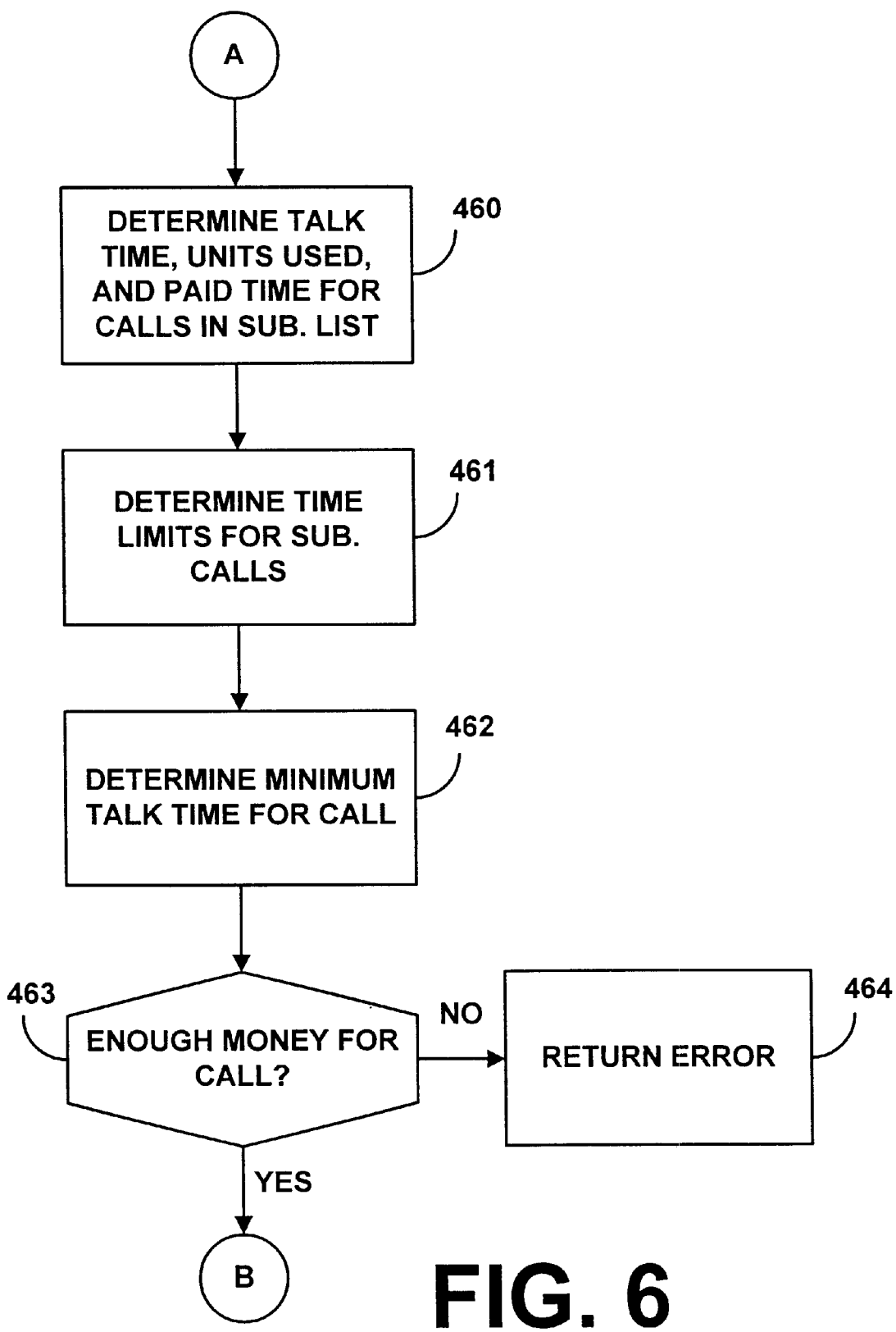
FIG. 6 is a flowchart continuation of FIG. 5.

Referring not to FIG. 6, as previously mentioned with reference to block 450, if the call is not already in the subscriber's list of calls, the call rating system 100 needs to determine if there is enough memory to add this call. As shown by block 460, each call already in the subscriber's list is then recalculated as previously described with reference to block 430. As shown by block 461, the call rating system 100 then executes the calc_limits procedure to determine the time limits for the subscriber's calls. The calc_limits procedure is described in detail with reference to FIG. 8. The call rating system 100 then determines the minimum talk time for the call, as shown by block 462. As shown by block 463, the call rating system 100 then determines whether there are enough funds in the subscriber's account for the call. If there are not enough funds in the subscriber's account to support the call, the call is rejected, as shown by block 464.

Figure 7:
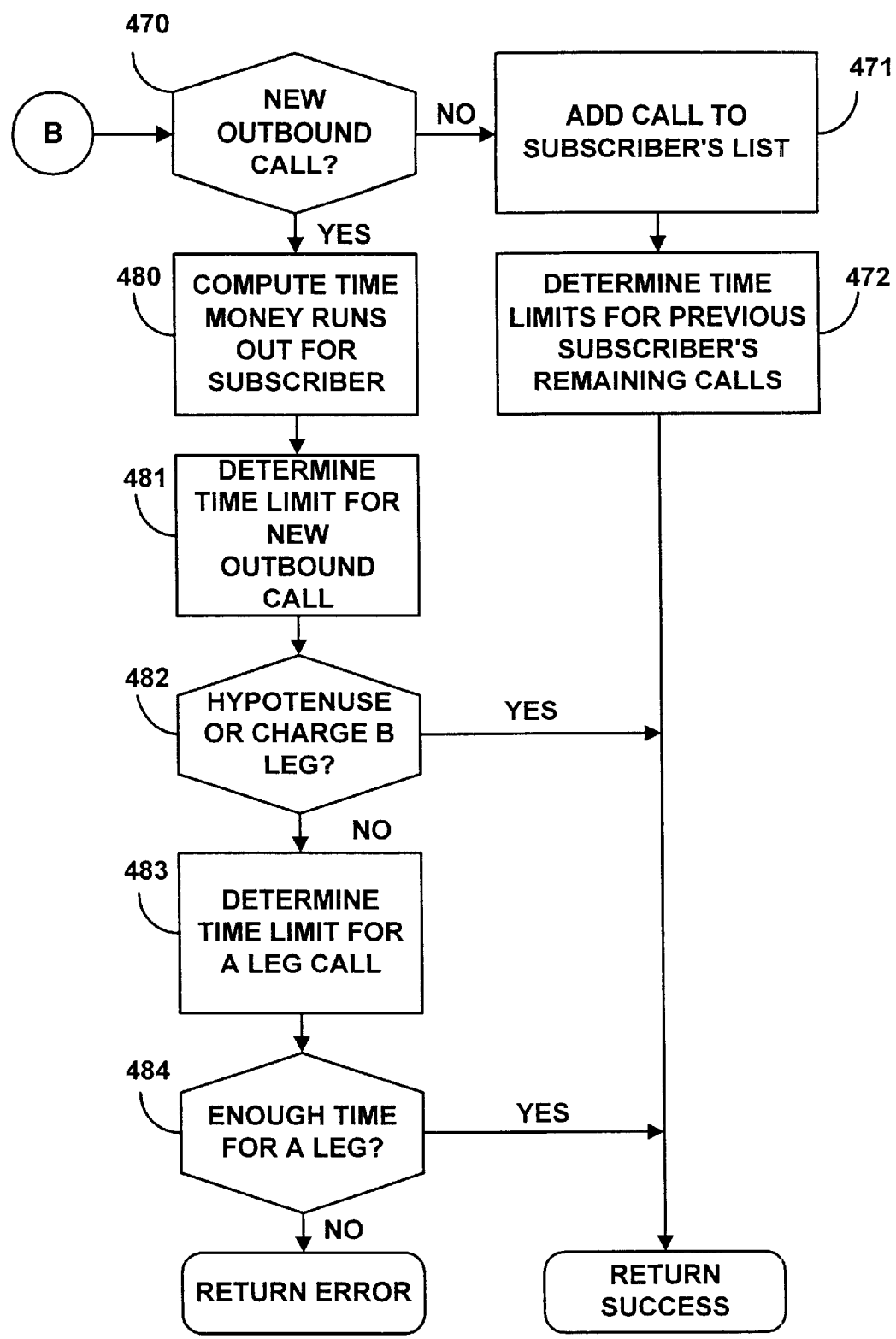
FIG. 7, as a continuation of FIGS. 5 and 6, is a flowchart logically illustrating a compute_call procedure performed by the call rating system of FIG. 1.

FIG. 7, as a continuation of FIG. 6, further illustrates logic performed in accordance with the call rating system 100 of the preferred embodiment of the invention. As shown by block 470, when the call rating system 100 determines that enough money exists in the subscriber's account for the call, a check is performed to determine whether the call is a new outbound call that has not yet been placed. For a new outbound call that has not yet been outdialed, special processing is required, as illustrated hereinbelow by steps 480–484. As shown by block 471, the call rating system 100 adds the new call to the subscriber's list of calls if the call is not a new outbound call that has not been placed yet. As shown by block 472, the call rating system 100 then determines the time limits for the previous subscriber's remaining calls by performing the calc_limits procedure, as further illustrated in FIG. 7.

As shown by block 480, if there is a new outbound call, the call rating system 100 determines the time when the subscriber's money will run out, as shown by block 480. In accordance with the preferred embodiment, a new outbound call is a call in which the subscriber has previously specified the number to call, but the call rating system 100 has not yet placed. This determination is also referred to as a calc_gone time, which is further described with reference to FIG. 9 hereinbelow. As shown by block 481, the call rating system 100 then determines the time limit for the new outbound call by using the calculated calc_gone_time.

As shown by block 482, a determination is then made by the call rating system 100 as to whether the new outbound call is the B leg of a hypotenuse or a charge B leg call. If the new outbound call is the B leg of a hypotenuse or a charge B leg call, processing is complete, the compute_call procedure returns success, and the call rating system proceeds to place the new outbound call.

However, as shown by block 483, if the new outbound call is not the B leg of a hypotenuse or a charge B leg call, the call rating system 100 determines the time limit for the A leg of the call using the time when the subscriber's available balance would be used, otherwise referred to as the "tGone" time. The value of tGone is further used hereinafter by the calc_gone_time procedure of FIG. 9.

As shown by block 484, a determination is then made as to whether the time remaining for the A Leg, in accordance with the amount left in the subscriber's account, is enough for the B Leg to last its minimum call length. In accordance with the preferred embodiment of the invention, the minimum call length is the minimum amount of time that a call already in progress must be allowed to continue. The minimum call length is used to "reserve" time for the call so that new calls will not be allowed unless the required time for the new call can be reserved.

If the A leg cannot last long enough, the outdial cannot be placed, and the subscriber is told that there is not enough money to place the call. However, if the A leg can last long enough, the outdial is placed.

Figure 8:
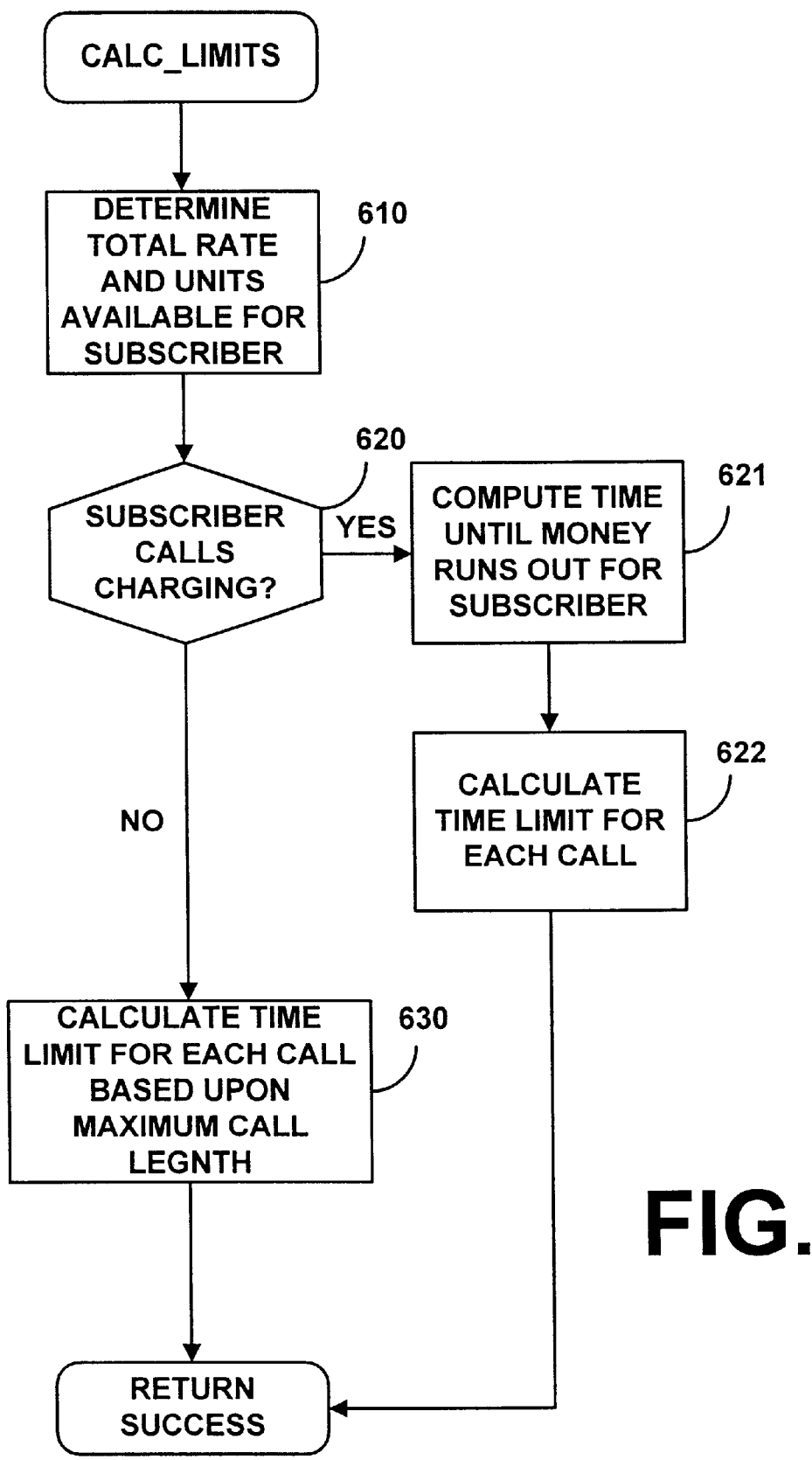
FIG. 8 is a flowchart logically illustrating a calc_limits procedure performed by the call rating system of FIG. 1.

Referring now to FIG. 8, the calc_limits procedure is described in accordance with the preferred embodiment of the invention. As described with reference to FIGS. 5 and 6, the calc_limits procedure is used to calculate the time limit for all subscriber calls. As shown by block 610, a determination is first made by the call rating system 100 to determine the total rate and total units available for the subscriber. The total rate is the units per second value in the calc_gone procedure of FIG. 9. As such, for each call, the subsequent rate is divided by the subsequent period, to which the total per second rate is added. The total units available for the subscriber is equal to the subscriber's account balance less the total of units used by all calls in progress, less the units reserved for pending outdial calls.

As shown by block 620, the call rating system 100 then determines whether any of the subscriber's calls are charging calls. If none of the subscriber calls are charging calls, as shown by block 630, each call's time limit is based upon a max_call_length parameter, wherein the max_call_length parameter is the configured maximum call length allowed on the call rating system. Preferably, the default is set to twenty-four hours. In addition, if there are no charges for a call, the time limit for the call is set to the maximum allowed.

If, however, there are subscriber calls that are charging, the time limit for each charging call is set such that the subscriber's available balance is not exceeded if all calls continue to their individual limits. As such, as shown by block 621, the call rating system 100 executes the calc_gone_time procedure to determine when the subscriber's available balance will run out. As previously mentioned, the calc_gone_time procedure is further described with reference to FIG. 9 hereinbelow.

As shown by block 622, after the call rating system 100 computes the time at which the subscriber's available balance will run out, it calculates the time limit for each charging call based upon the "gone" time, which has been previously computed by the calc_gone_time procedure. For each charging call, the time limit is set to the end of the last billing period, which ends at or before the "gone" time.

Figure 9:
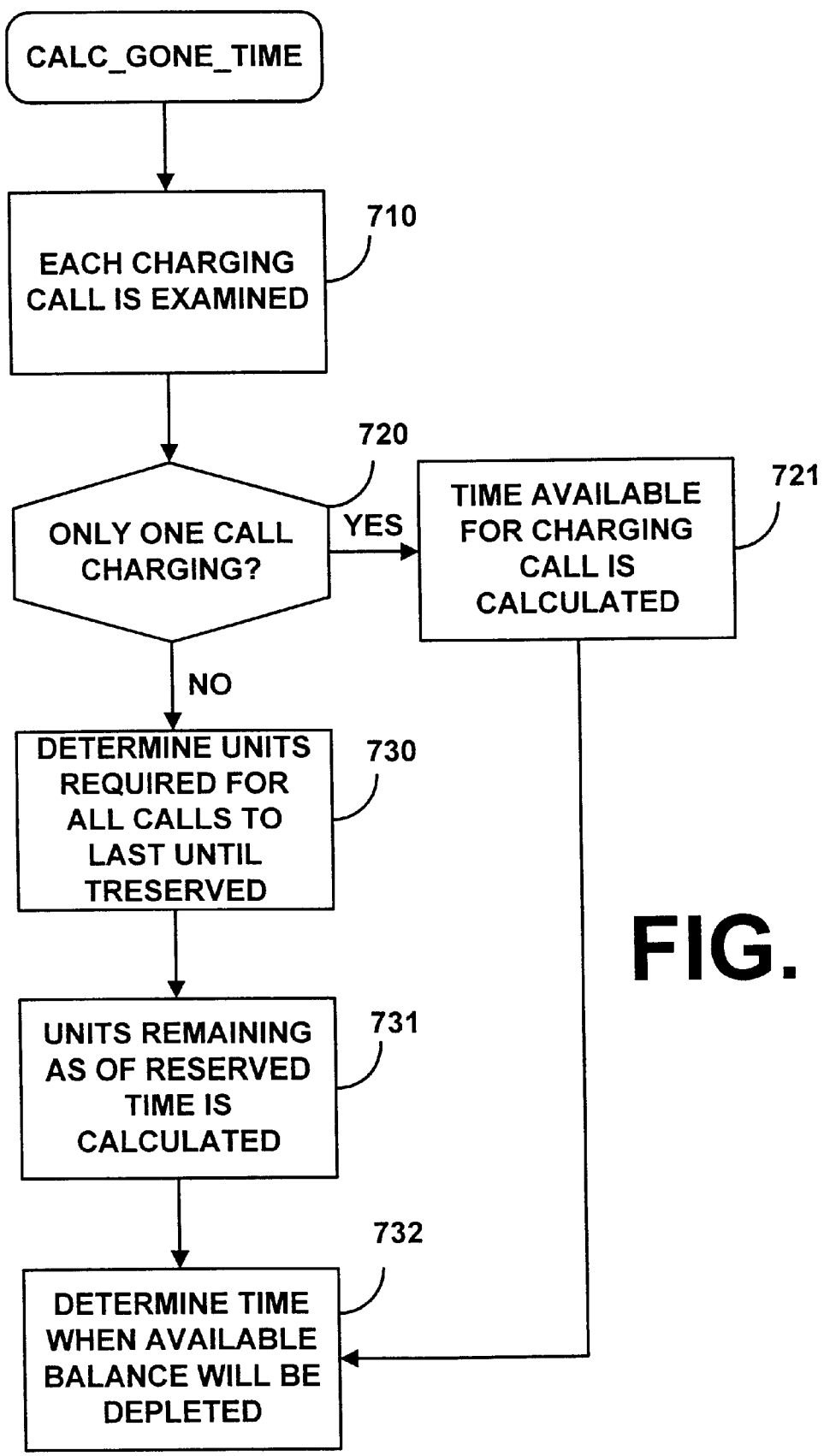
FIG. 9 is a flowchart logically illustrating a calc_gone_time procedure performed by the call rating system of FIG. 1.

Referring now to FIG. 9, a flow chart logically describing the calc gone time procedure is offered. Briefly described, the calc_gone_time procedure estimates the time in which the subscriber's available balance will be depleted for all calls in progress.

As shown by block 710, each charging call for the subscriber is examined. A reserved time (tReserved) is calculated and set as the time to be reserved for the call being examined. The reserved time accounts for the minimum call length, initial billing period, and minimum continuation time. The units for the reserved time (unitsRes) are subtracted from the subscriber's available balance (unitsAvail). The units per second, used for all calls, is then totaled in order to estimate when the subscriber's available balance will be depleted. To calculate the units per second, the subsequent rate is divided by the subsequent period, and the result is added to the total per second rate. For each call, if the resulting reserved time for the call is later than tReserved, the value for tReserved is set to that call's reserved time.

As shown by block 720, the call rating system 100 then determines if only one call is being charged, or is charging. If only one call is charging, the time available for the charging call is calculated, as shown by block 721. In accordance with the preferred embodiment of the invention, the time available for the charging call is equal to (unitsAvail−unitsReserved) divided by the billing rate, multiplied by the billing period. The time that the subscriber's balance runs out (tGone) is equal to tReserved for the call +the time available for the charging call.

However, if more than one call is charging, as shown by block 730, for each call that is charging, the units required for the charging call to end at tReserved is calculated. This is performed using the following equation, where tStart is the start time of the call.

$$\text{Units reserved} = \text{initial rate} + ((\text{tReserved} - \text{tStart} + \text{initial period}) * (\text{subsequent rate}/\text{subsequent period})) \quad \text{(Eq. 1)}$$

As shown by block 731, the units remaining (units) as of the reserved time (tReserved) is then calculated by subtracting the total units reserved (unitsRes) from the available balance (unitsAvail). The result (units) is then divided by the total "per second rate" (unitsPerSec) to determine the number of seconds (secLeft) after the reserved time that the subscriber's balance will run out. As shown by block 732, the time (tGone) when the available balance will be depleted is then determined by adding the result (secsLeft) to the reserved time (tReserved).

In accordance with an alternative embodiment of the invention, a subscriber's account balance may be further defined by a grace amount. The grace amount is a specified minimum balance, either predefined or not, that upon being reached, causes the call rating system 100 to seek an increase of the subscriber's account balance. It should be noted that obtaining an increase in the subscriber's amount may be performed either prior to when the account balance exactly reaches the grace amount, when the account balance exactly reaches the grace amount, or after the account balance goes below the grace amount.

During the period in which the call rating system 100 is obtaining an increase in the account balance, current calls may be continued in accordance with abovementioned limits. Alternatively, the grace amount may be set to be the same as when the account balance reaches zero. As such, when the subscriber's account balance is depleted, the call rating system 100 will automatically seek additional funds to increase the account balance for future debit card use.

As would be appreciated by one skilled in the art, since personal information, such as credit card numbers and expiration dates, is stored prior to use of debit cards, electronic transfer methods may be used in order to increase the subscriber's account balance.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments(s) of the invention without departing substantially from the spirit and principles of the invention. All such modifications and variations are intended to be included herein within the scope of the present invention and protected by the following claims.

What is claimed is:

1. A method for setting time limits for multiple calls on a debit card having a balance, the method comprising the steps of:
   reserving a minimum continuation time for any calls in progress;
   reserving a minimum call time for any new calls;
   estimating the time until said debit card balance reaches zero, based upon said minimum continuation time and said minimum call time; and
   setting a time limit for said calls based upon said estimating step.

2. The method of claim 1, further comprising the step of accepting or rejecting a new call based upon the time limit in said setting step.

3. The method of claim 1, further comprising the step of repeating the steps of claim 1 for each new call, while continuing prior calls.

4. The method of claim 3 further comprising the step of accepting or rejecting a new call based upon the latest time limit established in the most recent repetition of repeating the steps of claim 1 for each new call, while continuing prior calls.

5. The method recited in claim 1, further comprising the step of resetting said minimum continuation time for any calls in progress, said minimum call time for any new calls, said time until said debit card balance reaches zero, and said time limit for said calls, when a call service is invoked.

6. The method recited in claim 1, further comprising the step of resetting said minimum continuation time for any calls in progress, said minimum call time for any new calls, said time until said debit card balance reaches zero, and said time limit for said 4 calls, when an outbound call is seized.

7. The method recited in claim 1, further comprising the step of resetting said minimum continuation time for any calls in progress, said minimum call time for any new calls, said time until said debit card balance reaches zero, and said time limit for said calls, when an outbound call is requested by a subscriber.

8. The method recited in claim 1, further comprising the step of resetting said minimum continuation time for any calls in progress, said minimum call time for any new calls, said time until said debit card balance reaches zero, and said time limit for said calls, when an inbound call arrives.

9. The method recited in claim 1, further comprising the step of resetting said minimum continuation time for any calls in progress, said minimum call time for any new calls, said time until said debit card balance reaches zero, and said time limit for said calls, when a first call is connected to another call.

10. The method recited in claim 1, further comprising the step of resetting said minimum continuation time for any calls in progress, said minimum call time for any new calls, said time until said debit card balance reaches zero, and said time limit for said calls, when a first call is connected to a conference.

11. The method recited in claim 1, further comprising the step of resetting said minimum continuation time for any calls in progress, said minimum call time for any new calls, said time until said debit card balance reaches zero, and said time limit for said calls, when a first call is connected to an internal call resource.

12. The method recited in claim 1, further comprising the step of resetting said minimum continuation time for any calls in progress, said minimum call time for any new calls, said time until said debit card balance reaches zero, and said time limit for said calls, when either of an inbound or an outbound call is answered.

13. The method recited in claim 1, further comprising the step of rejecting a new call if said estimated time until said debit card balance reaches zero does not exceed said reserved minimum call time for any new calls.

14. The method recited in claim 1, wherein said debit card is a calling card.

15. The method recited in claim 1, further comprising the step of increasing said debit card balance prior to said account balance reaching zero.

16. A system for setting time limits for multiple calls on a debit card having a balance, comprising:
    a means for reserving a minimum continuation time for any calls in progress;
    a means for reserving a minimum call time for any new calls;

a means for estimating the time until said debit card balance reaches zero, based upon said minimum continuation time and said minimum call time; and a means for setting a time limit for said calls based upon said estimated time estimated by said means for estimating.

17. The system of claim 16, further comprising a means for accepting or rejecting a new call based upon said time limit received by said means for setting a time limit.

18. The system of claim 16, further comprising a means for accepting or rejecting a new call based upon the latest time limit established by said means for setting a time limit.

19. The system of claim 16, further comprising a means for resetting said minimum continuation time for any calls in progress, said minimum call time for any new calls, said time until said debit card balance reaches zero, and said time limit for said calls, when a call service is invoked.

20. The system of claim 16, further comprising a means for resetting said minimum continuation time for any calls in progress, said minimum call time for any new calls, said time until said debit card balance reaches zero, and said time limit for said calls, when an outbound call is seized.

21. The system of claim 16, further comprising a means for resetting said minimum continuation time for any calls in progress, said minimum call time for any new calls, said time until said debit card balance reaches zero, and said time limit for said calls, when an outbound call is requested by a subscriber.

22. The system of claim 16, further comprising a means for resetting said minimum continuation time for any calls in progress, said minimum call time for any new calls, said time until said debit card balance reaches zero, and said time limit for said calls, when an inbound call arrives.

23. The system of claim 16, further comprising a means for resetting said minimum continuation time for any calls in progress, said minimum call time for any new calls, said time until said debit card balance reaches zero, and said time limit for said calls, when a first call is connected to another call.

24. The system of claim 16, further comprising a means for resetting said minimum continuation time for any calls in progress, said minimum call time for any new calls, said time until said debit card balance reaches zero, and said time limit for said calls, when a first call is connected to a conference.

25. The system of claim 16, further comprising a means for resetting said minimum continuation time for any calls in progress, said minimum call time for any new calls, said time until said debit card balance reaches zero, and said time limit for said calls, when a first call is connected to an internal call resource.

26. The system of claim 16, further comprising a means for resetting said minimum continuation time for any calls in progress, said minimum call time for any new calls, said time until said debit card balance reaches zero, and said time limit for said calls, when either of an inbound or an outbound call is answered.

27. The system of claim 16, further comprising a means for increasing said debit card balance prior to said account balance reaching zero.

28. A computer readable medium for setting time limits for multiple calls on a debit card having a balance comprising logic for performing the steps of:

reserving a minimum continuation time for any calls in progress;

reserving a minimum call time for any new calls;

estimating the time until said debit card balance reaches zero, based upon said minimum continuation time and said minimum call time; and setting a time limit for said calls based upon said estimating step.

29. The computer readable medium of claim 28, wherein said logic is further defined as performing the step of accepting or rejecting a new call based upon the time limit in said setting step.

30. The computer readable medium of claim 28, wherein said logic is further defined as performing the step of repeating the steps of claim 28 for each new call, while continuing prior calls.

31. The computer readable medium of claim 30, wherein said logic is further defined as performing the step of accepting or rejecting a new call based upon the latest time limit established in the most recent repetition of repeating the steps of claim 28 for each new call, while continuing prior calls.

32. The computer readable medium of claim 28, wherein said logic is further defined as performing the step of resetting said minimum continuation time for any calls in progress, said minimum call time for any new calls, said time until said debit card balance reaches zero, and said time limit for said calls, when a call service is invoked.

33. The computer readable medium of claim 28, wherein said logic is further defined as performing the step of resetting said minimum continuation time for any calls in progress, said minimum call time for any new calls, said time until said debit card balance reaches zero, and said time limit for said calls, when an outbound call is seized.

34. The computer readable medium of claim 28, wherein said logic is further defined as performing the step of resetting said minimum continuation time for any calls in progress, said minimum call time for any new calls, said time until said debit card balance reaches zero, and said time limit for said calls, when an outbound call is requested by a subscriber.

35. The computer readable medium of claim 28, wherein said logic is further defined as performing the step of resetting said minimum continuation time for any calls in progress, said minimum call time for any new calls, said time until said debit card balance reaches zero, and said time limit for said calls, when an inbound call arrives.

36. The computer readable medium of claim 28, wherein said logic is further defined as performing the step of resetting said minimum continuation time for any calls in progress, said minimum call time for any new calls, said time until said debit card balance reaches zero, and said time limit for said calls, when a first call is connected to another call.

37. The computer readable medium of claim 28, wherein said logic is further defined as performing the step of resetting said minimum continuation time for any calls in progress, said minimum call time for any new calls, said time until said debit card balance reaches zero, and said time limit for said calls, when a first call is connected to a conference.

38. The computer readable medium of claim 28, wherein said logic is further defined as performing the step of resetting said minimum continuation time for any calls in progress, said minimum call time for any new calls, said time until said debit card balance reaches zero, and said time limit for said calls, when a first call is connected to an internal call resource.

39. The computer readable medium of claim 28, wherein said logic is further defined as performing the step of resetting said minimum continuation time for any calls in progress, said minimum call time for any new calls, said time until said debit card balance reaches zero, and said time limit for said calls, when either of an inbound or an outbound call is answered.

40. The computer readable medium of claim 28, wherein said logic is further defined as performing the step of rejecting a new call if said estimated time until said debit card balance reaches zero does not exceed said reserved minimum call time for any new calls.

41. The computer readable medium of claim 28, wherein said debit card is a calling card.

42. The computer readable medium of claim 28, wherein said logic is further defined as performing the step of increasing said debit card balance prior to said account balance reaching zero.

* * * * *